US012801618B2

(12) United States Patent
Theodorakis et al.

(10) Patent No.: US 12,801,618 B2
(45) Date of Patent: Nov. 17, 2026

(54) EFFICIENT TEMPORAL GRAPH DATA MANAGEMENT

(71) Applicant: Neo4j Sweden AB, San Mateo, CA (US)

(72) Inventors: Georgios Theodorakis, London (GB); James Clarkson, Tewkesbury (GB); James Webber, Guildford (GB)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 19/078,890

(22) Filed: Mar. 13, 2025

(65) Prior Publication Data

US 2025/0291806 A1 Sep. 18, 2025

Related U.S. Application Data

(60) Provisional application No. 63/565,188, filed on Mar. 14, 2024.

(51) Int. Cl.

| | |
|---|---|
| ***G06F 16/2458*** | (2019.01) |
| ***G06F 16/21*** | (2019.01) |
| ***G06F 16/901*** | (2019.01) |

(52) U.S. Cl.

CPC ........ *G06F 16/2477* (2019.01); *G06F 16/219* (2019.01); *G06F 16/9024* (2019.01)

(58) Field of Classification Search

CPC . G06F 16/2477; G06F 16/219; G06F 16/9024
USPC .......................................................... 707/746
See application file for complete search history.

(56) References Cited

U.S. PATENT DOCUMENTS

| | | | | |
|---|---|---|---|---|
| 2015/0379080 | A1 | 12/2015 | Jochimski | |
| 2017/0308620 | A1 | 10/2017 | Cao | |
| 2021/0124782 | A1* | 4/2021 | Karaca | G06F 16/90328 |
| 2021/0152364 | A1 | 5/2021 | Beecham | |
| 2021/0191932 | A1* | 6/2021 | de Jong | G06F 16/2453 |
| 2023/0342379 | A1 | 10/2023 | Abay | |

OTHER PUBLICATIONS

Hou et al. An Efficient Built-in Temporal Support in MVCC-based Graph Databases. https://arxiv.org/abs/2304.12212. Apr. 24, 2023.
Khurana et al. Efficient Snapshot Retrieval over Historical Graph Data. In ICDE. https://arxiv.org/abs/1207.5777. Jul. 24, 2012.
Khurana et al. Storing and Analyzing Historical Graph Data at Scale. https://arxiv.org/abs/1509.08960. Sep. 29, 2015.
Massri et al. Clock-G: A temporal graph management system with space-efficient storage technique. In ICDE. https://ieeexplore.ieee.org/document/9835183/. May 2022.
Vijitbenjaronk et al. Scalable Time-Versioning Support for Property Graph Databases. In Big Data. https://ieeexplore.ieee.org/iel7/8241556/8257893/08258092.pdf. 2017.

* cited by examiner

*Primary Examiner* — Michael Pham

(74) *Attorney, Agent, or Firm* — Van Pelt, Yi & James LLP

(57) ABSTRACT

A temporal graph database system is disclosed. In various embodiments, a call to a graph temporal application programming interface (API) is received via a communication interface. An estimated cardinality associated with the API call is determined. A selected graph temporal store to be used to generate a response to the API call is selected based at least in part on the estimated cardinality, wherein the selected graph temporal store is included in a plurality of graph temporal stores associated with a graph with which the API call is associated. The selected graph temporal store is used to generate a response to the API call.

20 Claims, 9 Drawing Sheets

300

| Access type | Java notation |
|---|---|
| Point Queries | Iterable<Node> getNode(nodeId, startTime, endTime)<br>Iterable<Relationship> getRelationship (relId, startTime, endTime)<br>Iterable<Iterable<Relationship>> getRelationships (nodeId, direction, startTime, endTime) |
| Subgraph Queries | Iterable<Iterable<Node>> expand (nodeId, direction, hops, startTime, endTime, timeStep) |
| Global Queries | Iterable<Entity> getDiff (startTime, endTime)<br>Iterable<Graph> getGraph (startTime, endTime, timeStep)<br>Graph getWindow (startTime, endTime)<br>Graph getTemporalGraph (startTime, endTime) |

FIG. 3

EFFICIENT TEMPORAL GRAPH DATA MANAGEMENT

CROSS REFERENCE TO OTHER APPLICATIONS

This application claims priority to U.S. Provisional Patent Application No. 63/565,188 entitled EFFICIENT TEMPORAL GRAPH DATA MANAGEMENT filed Mar. 14, 2024, which is incorporated herein by reference for all purposes.

BACKGROUND OF THE INVENTION

Modern graph database management systems (DBMSs) can process highly dynamic labeled property graphs (LPGs) with many billions of relationships comfortably, but those systems often ignore the temporal dimension of data, how a graph evolved over time. Temporal analytics allow users to query and compute over the graph throughout its history so that valuable line-of-business data is always accessible and never lost. However, existing approaches tend to be ad-hoc and vary in performance depending on the size of the effective graph workload, such as local pattern matching or global graph algorithms.

BRIEF DESCRIPTION OF THE DRAWINGS

Various embodiments of the invention are disclosed in the following detailed description and the accompanying drawings.

FIG. 3 illustrates in table form elements of a temporal graph API supported by an embodiments of a temporal graph database system.

DETAILED DESCRIPTION

Figure 1:
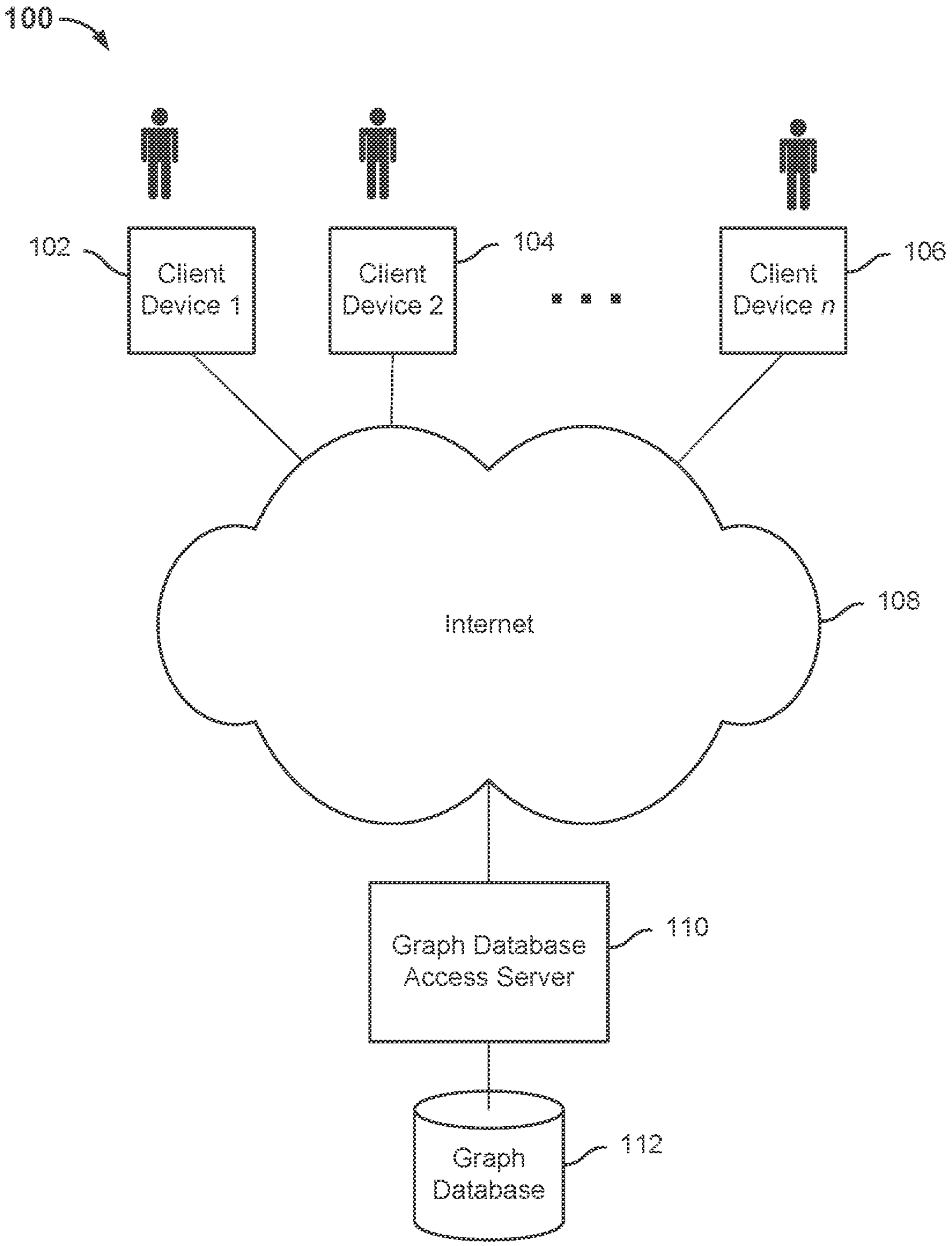
FIG. 1 is a block diagram illustrating an embodiment of a graph database system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A transactional temporal graph database management system (DBMS) is disclosed. In various embodiments, a system as disclosed herein decouples a graph's history from the latest graph version. To support efficient temporal analytics independently of workload characteristics, a hybrid temporal storage approach is implemented: (i) for fast full graph restoration at arbitrary time points, a service that indexes updates by time is used; (ii) for fine-grained graph history accesses, a service that indexes updates by entity identifiers is used. To enable incremental graph computations for improved latency, in various embodiments, a compute-efficient in-memory LPG representation is used.

Temporal analytics span a wide range of use cases, from data auditing and anomaly detection in "Internet of things" (IoT) devices, to mining trends over time, and restoring data to a previous version (i.e., perform data repair). These are important classes of applications, and graph DBMSs must be able to support them regardless of the prevailing characteristics of their workloads.

Relational Database Management Systems (RDBMS) have addressed the problem of temporal analytics over a single table, and temporal validity is even a standardized SQL:2011 feature. However, maintaining the history of a graph without a predefined schema is challenging. In response, in one prior approach, solutions involving commercial graph systems enhance the labeled property graph (LPG) model to store historical data as extra graph entities. While this may help solve the functional problem, it complicates application logic and incurs potential performance penalties for prevailing workloads. Another approach is to capture the temporal behavior using a sequence of snapshots by storing the graph state at a specific time and deltas between those snapshots. Again, this theoretically solves the functional problem, but it is prohibitively expensive for point- or small-neighborhood queries. Finally, systems such as Raphtory™ or IBM SystemG™ store the history of individual graph entities together, which allows fast local graph accesses but may result in an expensive all-history scan for full graph reconstruction.

In various embodiments, a transactional graph DBMS as disclosed herein accounts for one or more of the following challenges of temporal applications: (i) handle the dynamically changing structure of LPGs (i.e., schema-less data); (ii) enable temporal capabilities without affecting non-temporal operations (i.e., querying the latest version of the graph); (iii) efficient storage and retrieval of graph history for different workloads (i.e., handle time and graph size dimensions); and (iv) efficient query execution over parts of data that remain the same between time points.

In various embodiments, a system as disclosed herein includes and/or provides one or more of the following:

- (i) Temporal graph data model. Temporal graphs are formalized by enhancing LPGs with time capabilities that allow (bi-)temporal graph analytics. Cypher (an SQL-like graph query language for graphs) and/or other graph query language is extended with temporal constructs and idiomatic procedures for incremental processing from Cypher (or other graph QL).
- (ii) Temporal graph storage. To support efficient access to historical global graphs and subgraphs, a general-purpose temporal graph system is provided, which exposes an intuitive API to retrieve various temporal graph access patterns. Based on the workload characteristics, the system chooses between two temporal stores: (1) a first service configured to store and use full graph snapshots and (2) a second service optimized for efficient fine-grained graph history access, e.g., for a node or neighborhood, without user intervention.
- (iii) Integration with commercial graph DBMS. In various embodiments, a system as disclosed herein is integrated with a graph DBMS, such as Neo4j™, to provide transactional guarantees for temporal queries. In addition, efficient incremental graph computations are supported by introducing a memory-friendly dynamic LPG data structure.

In various embodiments, techniques disclosed herein are implemented in the context of a graph DMBS that supports the LPG model, in which optionally labeled nodes in a graph represent entities that, in turn, are connected by named, directed relationships and where both nodes and relationships can host properties as key-value pairs. This model is common to many modern graph databases for online transactional processing and graph analytical engines for online analytical processing. Prominent examples of graph databases include MemGraph™, Neo4j™, Neptune™, and TigerGraph™, which are designed to handle dynamically changing graphs at significant volume. Analytical engines enable high-performance (often parallel) graph computations on (static) graphs by adopting the vertex-centric model, e.g., Pregel, GraphLab, Giraph, or GraphX.

Neo4j™, for example, is a graph DBMS for out-of-core workloads that maintains its own page cache. All operations are transactional with (at least) read-committed isolation. Users access the database using Java APIs or Cypher queries locally or over the network using an efficient binary communication protocol called Bolt. For analytics on a static graph, Neo4j has the Graph Data Science (GDS) library and runtime: (i) a static Compressed Sparse Row (CSR) projection is constructed using the current graph; (ii) based on this graph projection, users can execute algorithms by calling procedures from Cypher. While Neo4j and its Cypher graph query language are referred to in various embodiments described herein, the techniques disclosed herein are applicable to a broader range of graph database management systems.

In relational database management systems, temporal analytics has been extensively studied, resulting in temporal validity becoming part of SQL:2011 standard. Relational databases capture the history of a table using the temporal table construct or allow users to query directly changes atop tables. Temporal SQL distinguishes two time dimensions: (i) system (or transaction) time, which represents when data was updated in the database; and (ii) application (or event) time, a timestamp from when an event occurred.

As graph database management systems typically do not have native support for temporal operations, they have historically used the model-based approach. Graph entities are enriched with additional time properties (e.g., validity duration), and historical data is stored as extra nodes and relationships. While this approach works with existing systems, it requires complicated application logic to perform graph operations and incurs significant storage and runtime overheads. For example, Gradoop is an analytical engine that supports distributed execution over the model-based approach at the significant cost of performing an all-history scan to retrieve valid graph parts.

Conversely, the snapshot-based approach captures temporal behavior using a sequence of snapshots (i.e., graph state materialization at a specific time) and logs deltas between them. Graph updates and snapshots are stored in disjoint buckets, called time windows, enabling compact data storage. Tegra implements a different approach for storing snapshots atop persistent adaptive radix trees (pART) and can accelerate ad-hoc analytics on arbitrary time windows of the graph. Though snapshot storage is more efficient than model-based storage, it remains prohibitively expensive for pattern-matching queries that access small subgraphs, e.g., nodes and/or neighborhoods, as it requires full snapshot materialization.

At the other end of the spectrum, systems such as Raphtory, IBM SystemG, and TGDB use a fine-grained storage approach: graph updates are stored in a key-value store, where the key is either a node or a relationship ID and the corresponding value is a list of that element's history. For example, with Raphtory, a distributed analytics system that maintains the complete graph history in memory, its temporal graph model allows updates via data streams (without transactions). However, extracting the graph snapshot at an arbitrary time requires scanning all updates. In practice, this is like the model-based approach and negatively affects global query performance.

While temporal tables are the accepted solution for maintaining history with a predefined schema, preserving the history of a dynamically changing LPG is considerably more challenging. The existing solutions tackle the problem by choosing one of the following approaches: (i) model-based, (ii) snapshot-based, or (iii) fine-grained storage. By choosing one solution, the systems are biased towards the strengths of that solution and are sub-optimal in performance terms for other workloads. In various embodiments, a general-purpose temporal graph storage engine as disclosed herein does not fall foul of such biases and works well for a wide range of workloads.

Some prior systems enable incremental execution, whereby previously computed results can be used to shorten the execution time of a current calculation. For example, Kickstarter enables incremental graph processing for monotonic algorithms like Breadth-First Search and Connected Components by capturing lightweight dependencies across results. Meanwhile, GraphBolt tracks fine-grained dependencies across intermediate values, which allows the incremental computation of non-monotonic algorithms, such as PageRank or Triangle Counting. However, these systems do not allow querying historical data and are not designed for dynamic labeled property graphs. Chronos is an offline snapshot-based temporal engine that supports both historical queries and incremental execution but requires an expensive pre-processing step to retrieve snapshots from disk. Finally, Tegra introduces the Incremental Computation by entity Expansion (ICE) model, which allows sharing arbitrary computations across iterative graph queries. All these incremental approaches account for node and relationship deletions.

FIG. 1 is a block diagram illustrating an embodiment of a graph database system and environment. In the example shown, graph database system and environment 100 includes a plurality of users, each associated with one or more client devices represented in FIG. 1 by client devices 102, 104, and 106. The client devices 102, 104, and 106 are connected via the Internet 108 (and/or one or more other networks) to graph database access server 110, which provides access to data stored in one or more graphs comprising graph database 112.

In various embodiments, graph database access server 110 includes a temporal graph database storage engine configured to store temporal graph data as disclosed herein. The graph database storage engine stores graph data in a manner, as disclosed herein, that facilitates rapid and efficient retrieval of graph data, including temporal graph queries.

In various embodiments, the LPG model and graph query language (e.g., Cypher) are extended to capture graph evolution over time. An LPG G may be defined as a pair G=(V, E), where V is a set of nodes and E is a set of relationships. Each node v∈V consists of a tuple v=(nid, l, p), with nid being a unique identifier, l a set of labels that tag the node, and p a set of key-value properties. Each relationship e∈E is represented as a tuple e=(rid, src, tgt, l, p), where rid is a unique identifier, src and tgt denote the IDs of the nodes connected by the relationship, l is a single (or empty) label, and p a set of key-value properties. The relationships are directed from src to tgt. The properties' key is a string; the value can be a string, a primitive data type, or an array type, while labels are strings. A relationship e is considered valid only if its src and tgt nodes are present in G, including when src and tgt are the same. When a node is deleted, its relationships must first be deleted to transition to a new consistent graph state.

Let U be a universe of graph updates, each an operation of inserting, deleting, or updating a graph entity. We assume these updates construct an infinite sequence of tuples S=⟨u1, u2, . . . ⟩. Each tuple is represented as u=(τ, id, op), where u(τ)∈T is a timestamp that denotes when a transaction committed the update (i.e., system time), id refers to the unique identifier of a graph entity (node or relationship), and op is the update operation performed. In various embodiments, T is an ordered time domain of discrete positive integer values. It is assumed that all updates are ordered by their timestamps, which implies that no further changes are allowed on past updates.

A graph entity g can be added to a graph G only if g∉G at the time of insertion (relationships also require their src and tgt to exist). A graph entity g can be deleted if g∈G during deletion. Updating graph entities refers to inserting, deleting, or updating properties and labels of existing graph entities. All graph updates yield a new valid LPG.

Temporal LPG is defined as a pair $G=(V_\tau, E_\tau)$, in which every node v∈Vτ consists of a tuple $v=(\tau_s, \tau_e, nid, l, p)$ and every relationship e∈E consists of a tuple $e=(\tau_s, \tau_e, rid, src, tgt, l, p)$. The timestamps $\tau_s$ and $\tau_e$ represent the start time point (inclusive) and end time point (exclusive) for which the graph entity g is valid, where $\tau_s(g)<\tau_e(g)$. A graph entity insertion for g sets $\tau_e(g)=\infty$, a deletion updates its former $\tau_e(g)$ to a new value, and a property/label modification is considered as a deletion followed by an insertion. As a temporal LPG is created based on a valid sequence of updates S on a consistent graph, it follows the graph update and LPG constraints. As an entity can be removed and inserted at a later timestamp (once or multiple times), a temporal LPG can include entities g with the same identifier and non-overlapping time intervals $[\tau_s(g), \tau_e(g))$.

Figure 2A:
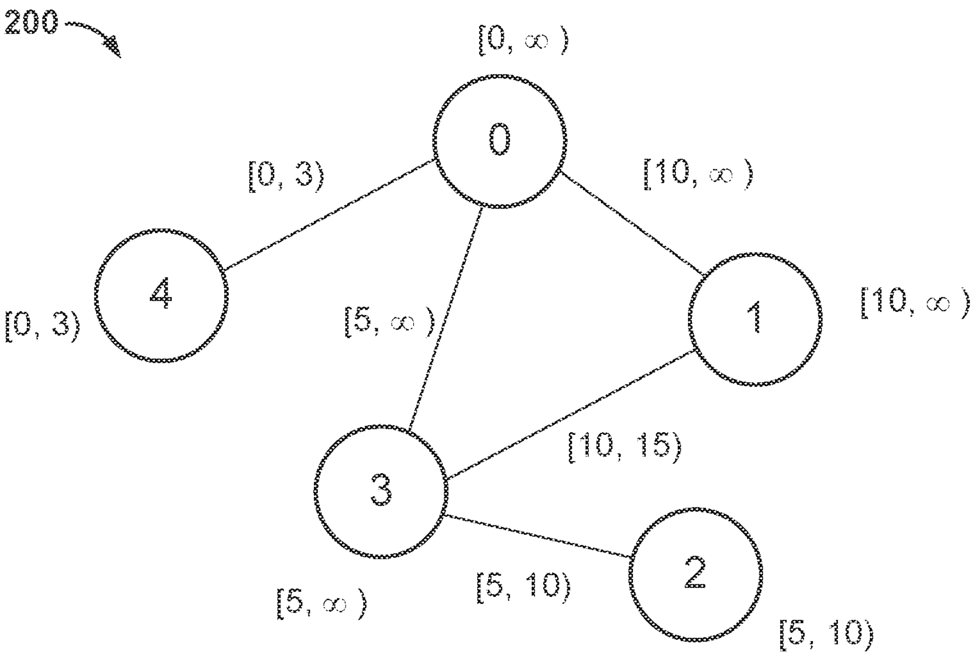
FIGS. 2A and 2B illustrate conceptually an example of a graph for which system start (i.e., creation, update) times and end (i.e., delete) times are stored in an embodiment of temporal graph database system.
Figure 2B:
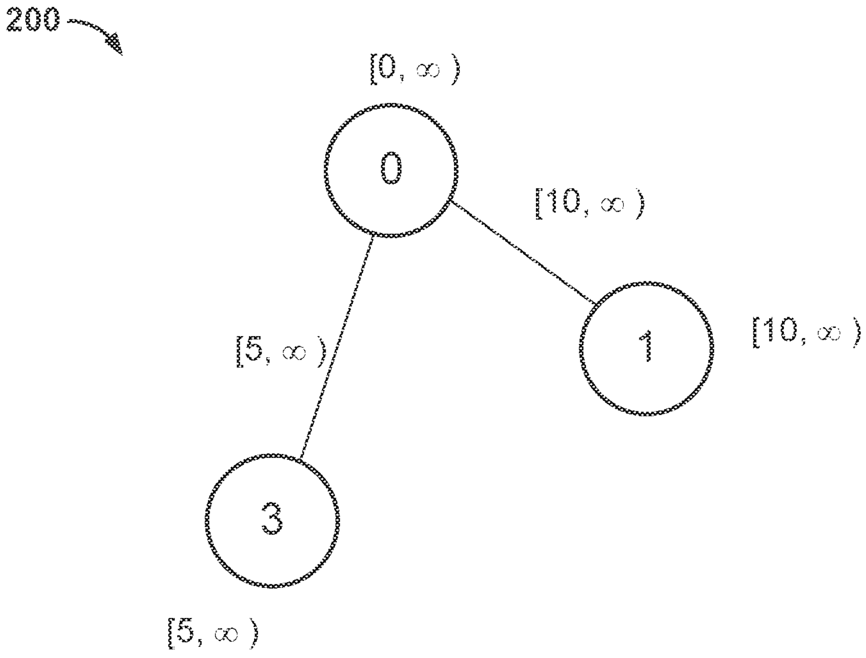

FIGS. 2A and 2B illustrate conceptually an example of a graph for which system start (i.e., creation, update) times and end (i.e., delete) times are stored in an embodiment of temporal graph database system. Referring first to FIG. 2A, in the example shown for each node (e.g., nodes 0, 1, 2, 3, and 4) and each relationship (e.g., those between nodes 0 and 4, 0 and 1, 0 and 3, 1 and 3, and 3 and 2) in the graph 200, corresponding system start (i.e., creation or update) time is and end (i.e., deletion) time $\tau_e$ information is annotated. For example, node 0 is shown to have been created at t=0 and not (yet) deleted. Similarly, the relationship between nodes 1 and 3 is shown to have been created/updated at time t=10 and deleted at t=14 (assuming a monotonically increasing time t and assuming an annotation in which a bracket is inclusive of the time listed and a parenthesis is exclusive of the time listed). FIG. 2B shows the same graph 200 in a state as it exists (or existed) at time t=11 (or later), for example, at which time the nodes and relationships shown have been created/updated but not (yet) deleted, as indicated by the listing of "infinity" as their end time, i.e., $\tau_e(g)=\infty$.

In various embodiments, the system start time and end time for each entity (e.g., node or relationship) is stored persistently in a temporal graph storage (or "store") as disclosed herein.

Given the temporal data model definition, it is observed that temporal graph analytic queries have two important dimensions: (i) system (transaction) time; and (ii) graph size. With respect to time, in various embodiments, a system as disclosed herein supports queries over a single time point that return a regular LPG or range queries over a time interval that return a temporal LPG. For graph size, in various embodiments, three access patterns are distinguished: (i) point queries of a single node or relationship; (ii) sub-graph queries (e.g., n-hop neighborhood); and (iii) global graph queries. An example of a point query over the time dimension is retrieving a node's state at an arbitrary timestamp or its history for a given time interval. Subgraph queries involve processing like computing the local clustering coefficient or the community evolution over time. Finally, an example of a global query is calculating the PageRank of a social network on a specific day or daily over a month to extract temporal trends.

Temporal Cypher. In various embodiments, queries in the time dimension are performed using the USE clause, an extension to the Cypher graph query language. Filtering by transaction time is enabled with the keyword FOR SYSTEM_TIME—based on SQL:2011 and commercial implementations of temporal tables—alongside an interval specifier that defines the time interval for the query. The foregoing approach allows the interval to be specified in a variety of ways such as: (i) AS OF $t_i$ that returns a valid graph at $t_i$; (ii) FROM $t_i$ TO $t_j$ that returns a temporal graph over the interval $(t_i, t_j)$; (iii) BETWEEN $t_i$ AND $t_j$ that returns a temporal graph over the interval $[t_i, t_j)$; and (iv) CONTAINED IN $(t_i, t_j)$ that returns a temporal graph over the interval $[t_i, t_j]$. For example, without limitation, a user can retrieve a node's history between t1 (inclusive) and t2 (exclusive); retrieve the n-hop neighborhood of an arbitrary node at t1; etc.

Bitemporal data model. To support bitemporal LPGs, in various embodiments, two additional graph properties are created: (i) application start time to capture the creation of an event; and (ii) application end time to capture the deletion of an event. In various embodiments, it is assumed the user manages the correctness of these properties, as arbitrary future and past dates can be assigned to data. A constraint is that the start time must be less than the end time for all graph entities. In various embodiments, filtering by application time in Cypher is expressed by extending the WHERE clause with a similar syntax as with system time. In this way, a user can retrieve a node at system time t1 with application time between [t2, t3], for example.

FIG. 3 illustrates in table form elements of a temporal graph API supported by an embodiments of a temporal graph database system. In the example shown, temporal graph API 300 includes three calls (interfaces) associated with point queries (in order starting from the top as shown in FIG. 3): (1) get node history between given timestamps; (2) get relationship history between given timestamps; and (3) get a nodes in/out relationship history between given timestamps. Temporal graph API 300 includes in this example a single call associated with subgraph queries, i.e., a call to get a given node's n-hop neighborhood history. Finally, the temporal graph API 300 includes four calls associated with global queries: (1) retrieve the difference between two time instances for a given graph (or substantial portion thereof); (2) get the history of a graph between given timestamps, at the granularity of a given time step; (3) filter graph history by a given time window; and (4) create a temporal graph.

The goal of a temporal graph API as disclosed herein, in various embodiments, is to provide the end user with a simple and intuitive interface to interact with the two dimensions of time-evolving graphs. Queries are categorized in terms of graph accesses. Point queries return a node, a relationship, or the relationships of a node based on a given direction (i.e., incoming, outgoing, or both). Subgraph queries are supported using the expand method that returns the neighborhood of a node for n-hops given a specified relationship direction. Finally, global queries return: (i) all graph updates between two timestamps (getDiff), enabling efficient incremental execution; (ii) LPG snapshots (getGraph); (iii) graph windows (getWindow); or (iv) temporal LPGs (getTemporalGraph).

The temporal dimension of queries is captured using the start and end transaction timestamp parameters in all methods. If these two parameters are equal, the result of the method call is a single graph entity or the snapshot of a (sub)graph. If end is greater than start, the result of point queries is the history of graph entities. For subgraph and global queries, the result is a temporal graph. The latter queries, however, require the additional step parameter, which specifies how many updates to apply before materializing the subsequent result. For example, getGraph(1993, 2023, 1-year) returns thirty more granular snap-shots (one per year) instead of creating a new snapshot for every single graph update applied in that time interval.

A user can extract temporal graphs with two distinct representations: a temporal graph (TGraph) or a set of regular snapshots (Iterative<Graph>). There exist categories of algorithms that work with either representation.

Figure 4A:
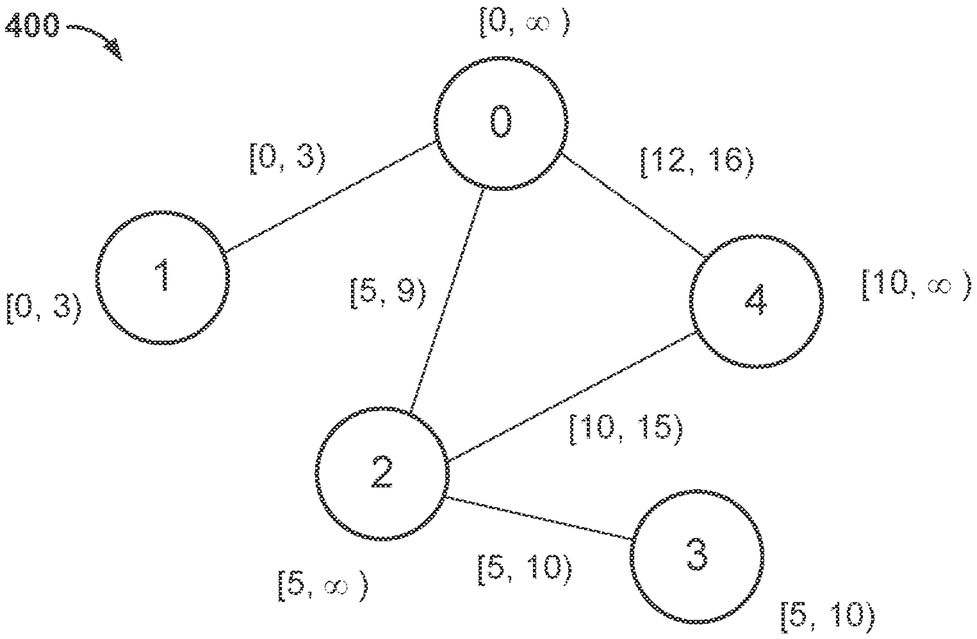
FIGS. 4A and 4B illustrate a simplified version of a temporal graph representing an aviation network 400, where nodes (airports) and relationships (flights) are annotated with time intervals.
Figure 4B:
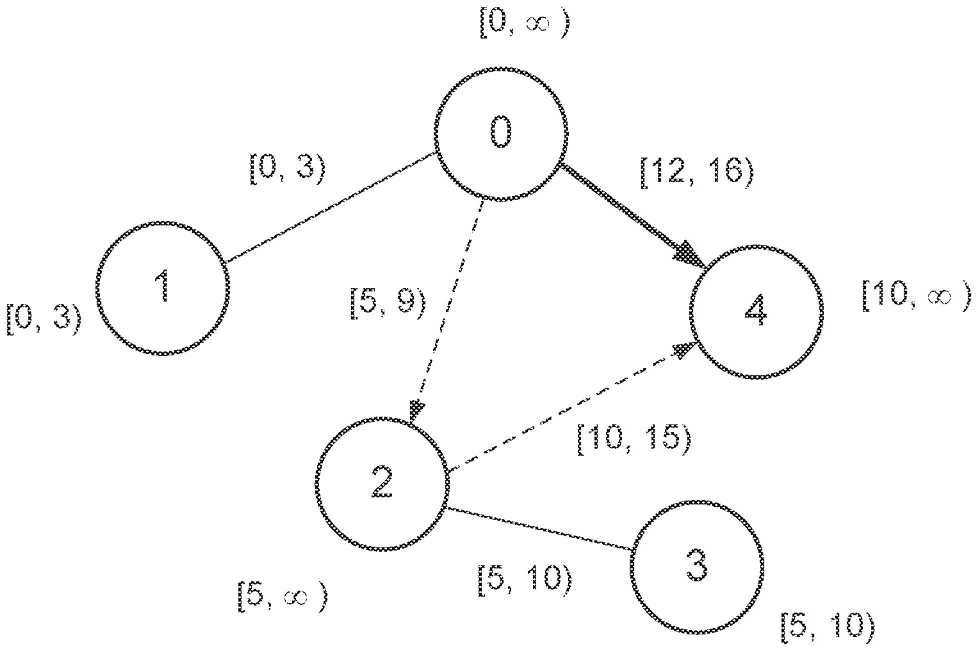

FIGS. 4A and 4B illustrate a simplified version of a temporal graph representing an aviation network 400, where nodes (airports) and relationships (flights) are annotated with time intervals. For example, the interval [0, 3) near node 1 denotes that the airport was open to incoming flights until t=2, and the interval over a relationship depicts a flight departure and arrival time. Similarly, the interval [10, ∞) adjacent to node 4 indicates that the airport opened at t=9 and remains open at the present time. This representation supports the efficient execution of temporal algorithms, such as describing temporal paths as a topological-optimum problem using a single scan approach instead of performing expensive joins across snapshots.

Referring to FIG. 4B, dashed arrow relationships between node 0 and node 2 and between node 2 and node 4 comprise the earliest-arrival path between the airports 0 and 4, i.e., depart node 0 at t=5 and arrive at node 4 (after changing flights at node 2) at t=14; while thick solid arrow represents the latest-departure path between the airports 0 and 4, i.e., departing at t=12.

Regarding graph windows (getWindow), we allow users to retrieve a graph snapshot based on a timestamp filter, that is, to retrieve a consistent graph based on all present graph entities between start and end. This includes the connections of these present nodes that are valid at start (i.e., not deleted), even though they are not part of the updates that occurred within the interval. Graph windows enable the extraction of trends with time locality while pruning inactive entities (e.g., e-commerce transactions of a specific week to capture Black Friday sales).

Figure 5A:
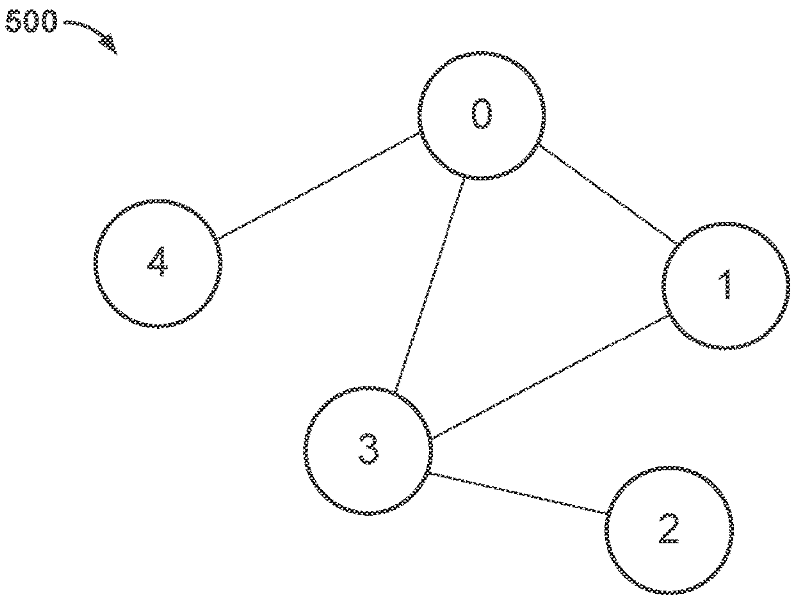
FIGS. 5A and 5B illustrates an example of retrieval and representation of a graph as it evolved over a time window in an embodiment of a temporal graph database system.
Figure 5B:
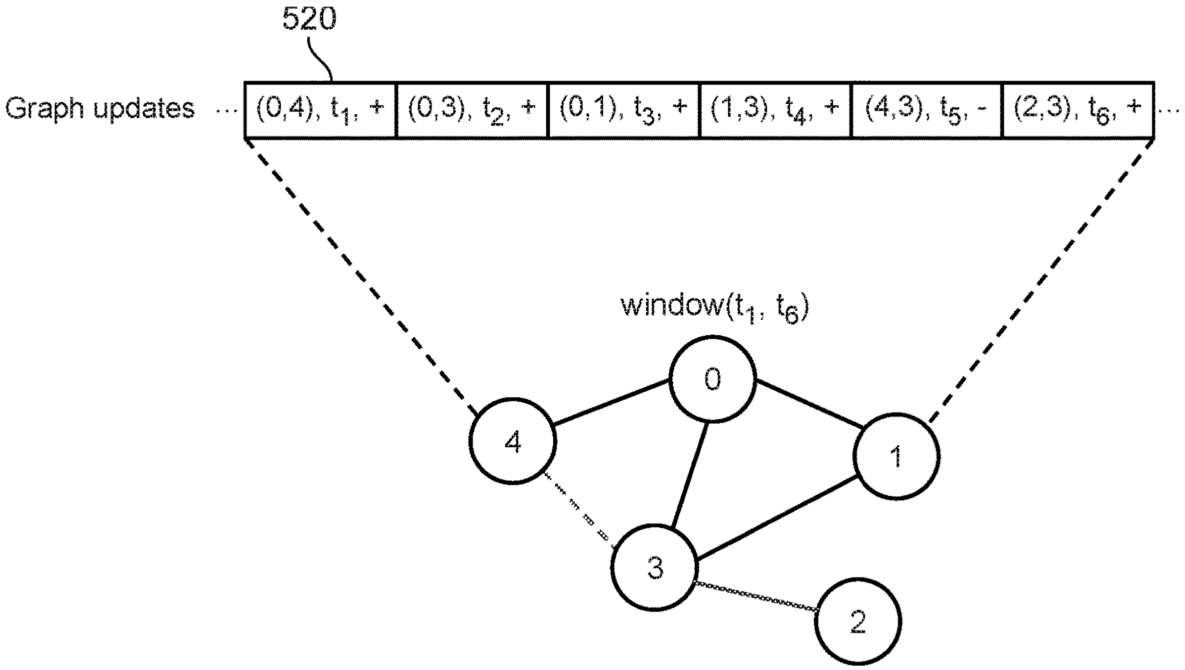

FIGS. 5A and 5B illustrates an example of retrieval and representation of a graph as it evolved over a time window in an embodiment of a temporal graph database system. Referring first to FIG. 5A, a graph 500 as it existed at time t=6 (or later) is shown. In FIG. 5B, graph updates 520 in a time window $t_1$ to $t_6$ inclusive are shown, along with a representation of the graph 500 as it changed over time because of the updates. In this example, only relationships were added or deleted, as indicated by the node tuple (e.g., (0,4)) and the arithmetic sign (e.g., "+" for add or update) included in each update. As shown, relationships were added at times $t_1$, $t_2$, $t_3$, $t_4$, and $t_6$, and the previously existing relationship between nodes 3 and 4 was deleted at time $t_5$, resulting in that relationship being shown as a dashed line in FIG. 5B.

In various embodiments, updates are modeled in a manner that uses storage space efficiently. For example, in some embodiments, the graph database is Neo4j™, which uses fixed-size records to store nodes and relationships. Fixed-size records allow constant time lookups based on offsets into a file (by simply multiplying a record ID by its corresponding record size). However, this is prohibitively expensive to replicate in our design as it can introduce more than 2× storage overhead, maintaining a full copy of the data for both stores.

In some embodiments, this issue is addressed by decoupling Neo4j's general-purpose graph storage format from a temporal storage format as disclosed herein. In the temporal graph case, variable-size records with two different record types are used: (i) fully materialized graph entities (e.g., a node with all its labels and properties); and (ii) deltas from the last update (e.g., a property deletion).

Figure 6:
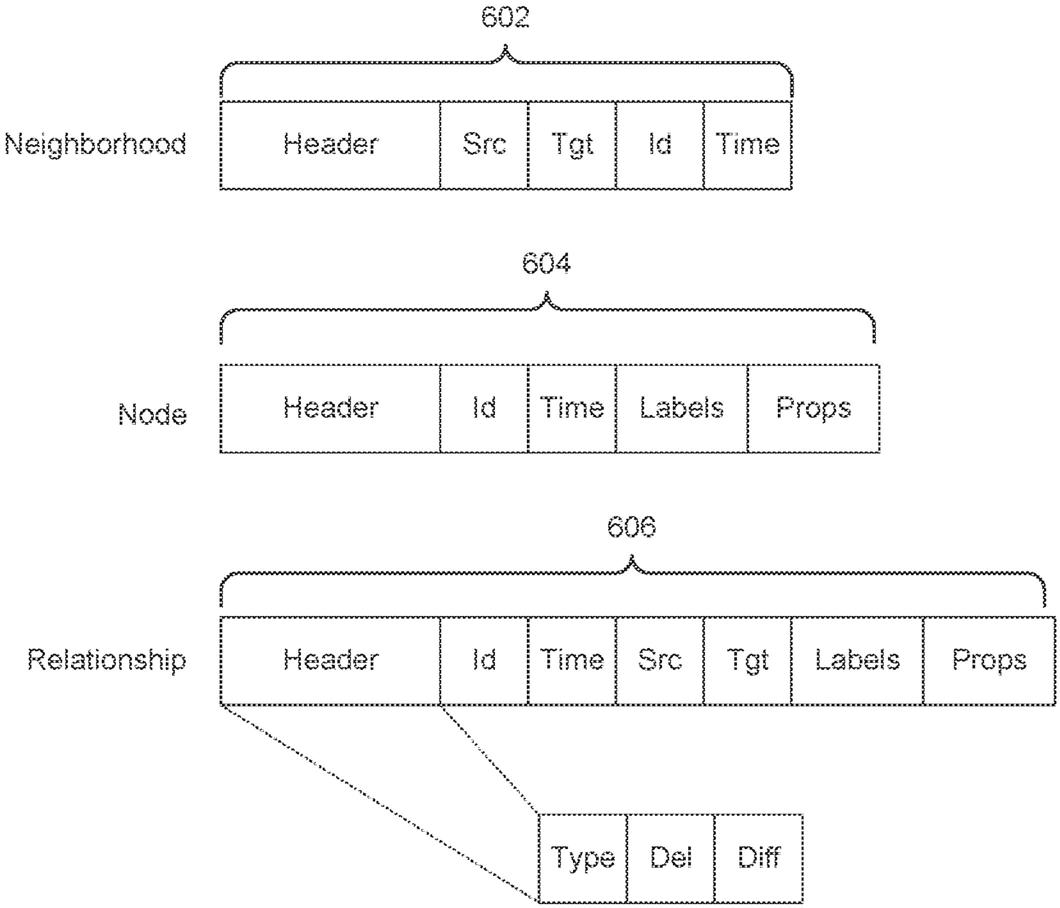
FIG. 6 shows the three graph entity records used to support a temporal graph API as disclosed herein, in various embodiments.

FIG. 6 shows the three graph entity records used to support a temporal graph API as disclosed herein, in various embodiments. A neighborhood entity 602 stores the original relationship ID along with the node IDs of its source and target, mapping it back to the source data. For outgoing relationships, the source is stored before the target, and for incoming relationships, the target is stored first. A node entity 604 stores its node ID, start time (i.e., created, updated) and end time (i.e., deleted, if applicable), node labels, and node properties. A relationship entity 606 stores its relationship ID, start time (i.e., created, updated) and end time (i.e., deleted, if applicable), relationship source, relationship target, relationship labels, and relationship properties.

When storing temporal graph entities to disk, in various embodiments, the first byte (the header) is reserved for metadata regarding the entity type (i.e., node, relationship, or neighborhood) and state (whether it is deleted, represents a delta from a previous update, or neither). To reduce space, in some embodiments, all entities track only the transaction timestamp when the insertion, deletion, or update occurred (i.e., start time). The end time can be inferred by updates that follow. Instead of storing the strings directly in disk records, in some embodiments, they are replaced with a reference (4 bytes) to a string store, substantially lowering the size of labels and properties. When storing labels, their number is stored first, followed by the actual label references. The most significant bit of a label's reference is reserved to denote whether it is present or deleted. For properties, a similar approach is followed and the three most significant bits of a property's reference are used to store information about its state (e.g., deleted) and data type (e.g., int, long, float, string, or primitive data array) to know how to interpret the bytes that follow.

Indexing by Time

We now describe the design of TimeStore, an instance of snapshot-based storage that implements a temporal graph API as disclosed herein. The basic component of TimeStore is a log that contains all graph changes (similar to a DB write-ahead log with no retention policy). The changes are ordered by monotonically increasing transaction timestamps. Maintaining a single log for all updates simplifies the design compared to previous solutions at the expense of missed opportunities for storage reduction. The log may contain either fully materialized entries or deltas using the storage format described above.

To index the log entries and accelerate lookups based on time, in various embodiments, TimeStore uses a B+Tree, resulting in O(log(n)) accesses, where n is the number of entries. Nonetheless, graph reconstruction from the beginning of time can be costly, and so TimeStore also eagerly creates snapshots based on a user-defined policy such that workload-specific expertise can be injected into the system. The policy can be time-based or operation-based (the number of updates), with the default being operation-based. These snapshots are stored on disk, and references to the files are maintained in a second B+Tree indexed by time. To avoid the I/O cost of reading graph snapshots from disk where possible, an in-memory Least Recently Used (LRU) cache for snapshots, called GraphStore, is used.

To retrieve a graph on an arbitrary timestamp, TimeStore fetches the snapshot (from disk or GraphStore) with the closest timestamp and then applies the forward graph changes to reach the correct state. For multiple consecutive snapshots or a temporal graph creation, it uses the getDiff operation to perform a range scan over the log. Point or subgraph queries require the creation of a snapshot, followed by reading, filtering, and applying all valid updates from the log. This is an expensive operation with graph retrieval outweighing both subgraph access and traversal costs.

Indexing by Entity History

With TimeStore supporting fast global analytics, we now focus on the second class of queries that access small parts of the graph, including those that comprise a small number of hops. LineageStore enables fast history access of graph entities at a node-, relationship-, and neighborhood-level to node labels and properties using the B+Tree indexes described above. The entries stored in LineageStore use a similar layout in FIG. 6, in various embodiments, but their attributes are rearranged to enable temporal ordering when stored as key-value pairs. The keys are composite and are ordered first by entity identifiers, node IDs or source and target IDs for relationships, and then by timestamp.

Instead of storing logical pointers to the log entries of TimeStore, we chose to store graph updates in place either as deltas or fully materialized entities. This is encoded as type in the entry's value and has the effect of increasing locality for graph accesses. Specifically, using B+Tree range scans, entity history can be retrieved with O(log(n)) time complexity, as all updates are ordered by timestamp in the same or adjacent B+Tree pages. For example, to retrieve the complete history of a node starting from a timestamp t, we perform a nodes.seek(low, high) range-scan, where low={nodeId, t} and high={nodeId, ∞}.

While updating node history is straightforward, relationship updates are more complicated: relationship creation or deletion also requires updating in- and out-neighbors indexes. Point and subgraph queries are translated directly to index lookups. LineageStore retrieves the relationships of nodes with direction d at timestamp t by performing a range-scan over the in- and out-neighbors indexes followed by a range-scan over the relationship index to reconstruct the correct entity versions. Then, if the neighbor (either source or target node ID depending on the direction d) has not been visited for that hop, it is added to the final result R. Global queries require an "all nodes" scan with one-hop expansions. Therefore, their processing cost depends solely on the size of the graph history.

To accelerate lookups for the application time dimension, a system as disclosed herein uses the hybrid store as with the system time, in some embodiments. However, this significantly penalizes ingestion cost as it requires updating multiple indexes, increases query complexity since it produces multiple execution plans, and adds storage overhead. Furthermore, as application time is user-defined, data may arrive out-of-order, requiring a watermark strategy to guarantee when data is safe to read. Therefore, in various embodiments, application start and end time are stored as graph properties. When querying with both time dimensions, i.e., both application time and system time, a valid (sub) graph with respect to system time is retrieved first, and then a filter is applied for the application time. If the application time is not set as a property, the system uses system time as a fall back.

In various embodiments, a hybrid temporal storage as disclosed herein provides efficient graph accesses. In various embodiments, a temporal graph DBMS as disclosed herein: (i) adapts its execution strategies to be sympathetic to the workload characteristics; (ii) stores temporal information with low overhead for write transactions; and (iii) limits redundancy-prone computations of temporal range queries.

In various embodiments, a temporal graph DBMS based on the hybrid temporal storage disclosed above is provided. In some embodiments, the system extends Neo4j™ and/or other graph databases to provide transactional guarantees for time-evolving queries. Backing temporal graph storage as disclosed herein with Neo4j's B+Tree implementation offers sortedness, scalable accesses, out-of-core storage, and seamless integration with the page cache for increased performance, in various embodiments.

Figure 7:
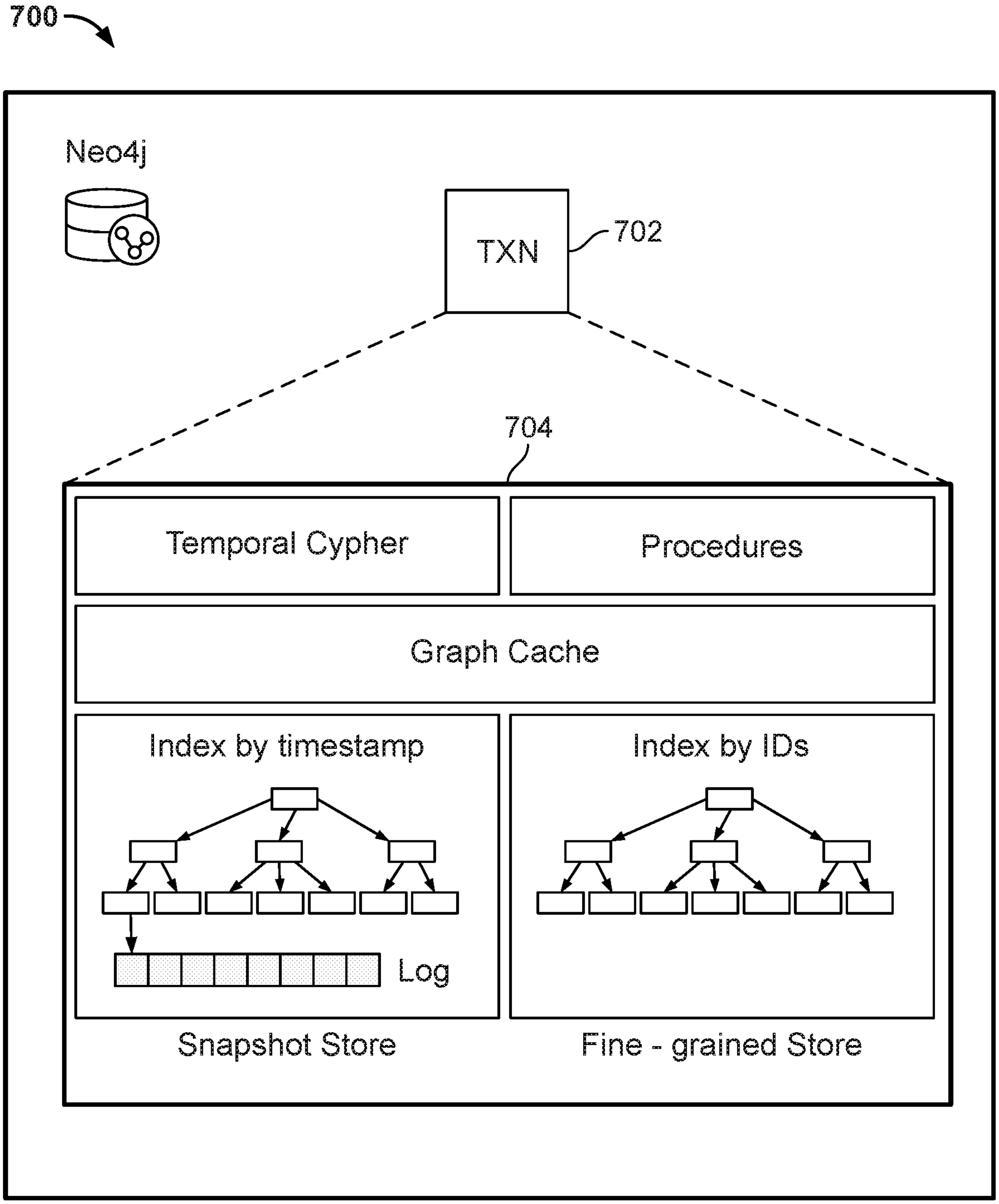
FIG. 7 is a block diagram illustrating an embodiment of a temporal graph database system.

FIG. 7 is a block diagram illustrating an embodiment of a temporal graph database system. In the example shown, temporal graph database system 700 receives and processes transactions 702 using a temporal graph storage 704.

In the example shown, temporal graph storage 704 includes modules to support use of a temporal extension to the Cypher query language ("Temporal Cypher"), as described above, and to support a temporal graph API as described above by wrapping API access calls with temporal procedures (i.e., functions invoked from Cypher). A graph cache is used to store recently accessed temporal graphs (or subgraphs), e.g., for quick access.

In various embodiments, temporal updates are stored separately from graph data to allow OLTP query execution over the latest graph version directly in the graph database (e.g., Neo4j) with no overhead in the common graph DBMS use case. In the example shown, temporal updates may be stored in one or both of a snapshot store, which stores point-in-time snapshots of the entire graph and logs updates between snapshot and a fine-grained store which indexes updates by entity (e.g., node, relationship).

In various embodiments, a temporal graph database system, such as temporal graph database system 700, processes transactions in or more of the three stages described in the following sections:

Stage 1. To capture the graph updates performed by write transactions (i.e., "graph updates"), in various embodiments, an event listener is registered to the graph DBMS' database management service. The event listener is invoked synchronously in the after-commit phase of a transaction, and the transaction succeeds only after writing to the graph temporal store, like updating an index; otherwise, the changes are rolled back, and the transaction is retried. From the event listener, the temporal graph storage gains access to all transactional commits, which ensures that: (i) updates are assigned a valid transaction time by default; and (ii) the system constraints described above are satisfied, as committed transactions always result in a consistent labeled property graph.

Stage 2. The temporal graph storage stores all changes to its hybrid temporal store as part of running transactions to uphold quality of service for OLTP workloads. In various embodiments, as described above, the hybrid store includes: (i) the GraphStore that maintains a set of (temporal) graph snapshots based on LRU policy; (ii) the TimeStore that serves global queries; and (iii) the LineageStore that serves point and small subgraph queries. However, indexing graph updates by both time and entity IDs leads to performance overheads for write transactions, which is undesirable for responsive applications. Thus, to provide low-latency transactional guarantees for temporal queries without affecting regular operations, in various embodiments, a system as disclosed herein updates synchronously only the TimeStore and then asynchronously the LineageStore using background worker threads. Specifically, when the event listener is invoked, the commits are persisted to TimeStore as part of the write transaction's after-commit phase for atomicity. Until LineageStore reaches an up-to-date view, the temporal graph store uses TimeStore to answer point and sub-graph queries, as both stores implement the temporal graph API described above with different time complexity. Finally, recovering from failures is handled by replaying the transaction log from the last persisted transaction time to get a consistent state. As such, a temporal graph store as disclosed herein maintains fault tolerance (in a single machine or cluster).

One option for storing snapshots for TimeStore was to utilize Neo4j's functionality of persisting full graph snapshots or deltas since a past graph version. Yet, this involves read transactions to access graph entities and copies metadata (e.g., indexes) not required for temporal analytics, which is overbearing for small write transactions, incurring up to seconds of increased latency. To avoid the problem, in various embodiments, the latest graph is retained in-memory using the GraphStore, similar to an HTAP approach, by synchronously applying all committed graph updates. This allows faster snapshot replication to memory and disk storage without expensive read transactions.

In various embodiments, the functionality of the temporal graph API described above is wrapped with temporal procedures (i.e., functions invoked from Cypher). The system also allows the creation of static CSRs (compressed sparse rows), known as graph projections, to be able to exploit the efficient parallel versions of the Graph Data Science (GDS) library's algorithms. In various embodiments, a system as disclosed herein supports the execution of algorithms directly on in-memory snapshots. This latter approach can be efficient for large graphs, as it does not involve the step of graph projection. Furthermore, executing algorithms on in-memory snapshots provides the basis for incremental graph computation, In various embodiments.

Stage 3. In various embodiments, to access historical data, users submit their queries using temporal Cypher or procedures, e.g., executed as part of a transaction. Temporal Cypher is parsed using javaCC and translated into an operator plan, for example. Based on the cardinality estimation of this generated plan, in various embodiments, a system as disclosed herein employs a simple heuristic to select between the two temporal stores: (i) if less than 30% of the graph is accessed, the system uses the LineageStore; (ii) otherwise, it constructs a full graph snapshot with the TimeStore. For cardinality estimation, the system uses base statistics such as the number of: (i) nodes and relationships; (ii) nodes with a specific label; (ii) relationships with a specific type; (iv) relationships with a predefined pattern (e.g., (:Label)-[:Type]→( )). In various embodiments, other rules, heuristics, etc. may be used to determine which temporal index/store to use. For example, point and subgraph (e.g., neighborhoods up to h hops) queries, LineageStore may be used, while for global queries TimeStore may be used.

Figure 8:
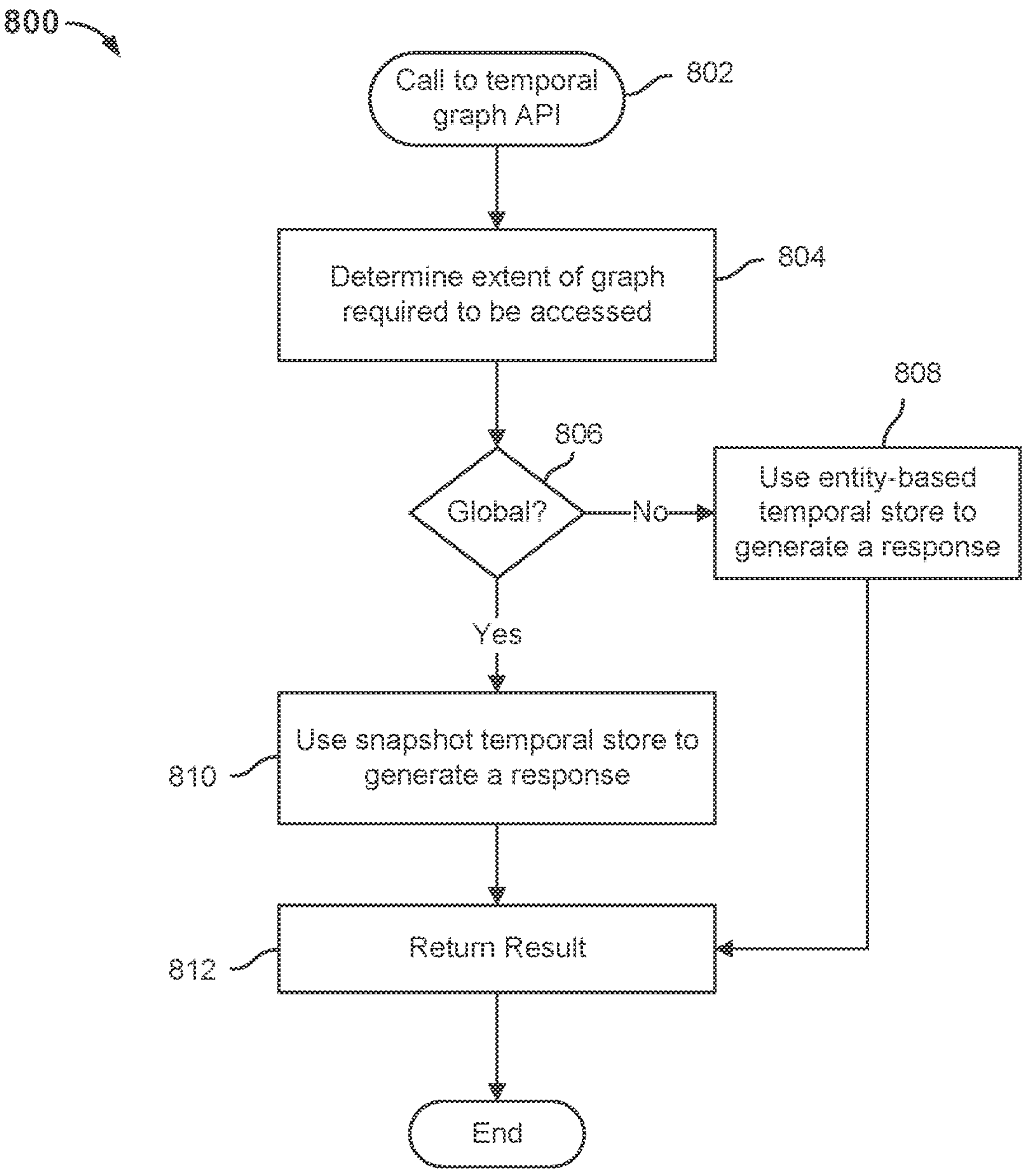
FIG. 8 is a flow diagram illustrating an embodiment of a process to implement a hybrid approach to generating responses to a temporal graph query, such as a call to a temporal graph API.

FIG. 8 is a flow diagram illustrating an embodiment of a process to implement a hybrid approach to generating responses to a temporal graph query, such as a call to a temporal graph API. In various embodiments, the process 800 of FIG. 8 may be performed by a temporal graph store, such as temporal graph store 704 of FIG. 7. In the example shown, process 800 starts with receipt of a call to a temporal graph API at 802. At 804, the extent of the graph required to be accessed to generate a response to the API call received at 802, i.e., a cardinality estimation, is determined. For example, a heuristic or rule as described above may be used to determine the extent required. At 806, if the request has been determined not to require access to the entire graph (or large subgraph), then at 808 an entity-based index comprising the temporal graph store is used to generate a response to the API call. If instead the entire graph (or a substantial portion thereof, e.g., greater than 30%) is required, e.g., a global temporal query (806), then at 810 a snapshot based index comprising the temporal graph store is used to generate a response to the API call. In either case (806, 808, 810), the generated response is returned at 812 to the API call.

In various embodiments, a graph temporal store as disclosed herein may be used with any graph database management system. For example, the embodiments described herein as being used with and/or in the context of a Neo4j system employs four Neo4j components: (i) Neo4j's B+Tree implementation for storage; (ii) the event listeners for the integration with the transaction layer; (iii) Cypher for its frontend; (iv) GDS projections for static graph analytics. In various embodiments, the B+Trees can be replaced by any persistent key-value store that allows composite key ordering, out-of-core storage, and range scans, such as RocksDB or other Log-Structured-Merge stores. The logic of accessing the key-value entries remains similar to as discussed above. Event listeners are considered a common approach for monitoring transactions in application frameworks, such as Spring, or commercial databases, such as Oracle or Memgraph. Thus, a graph temporal store as disclosed herein can be integrated into systems that support them. For systems that use an imperative language, such as Gremlin, the graph temporal API disclosed above may be implemented using the syntax and features of such languages. Finally, by extracting the graph history into GDS projections, a graph temporal store as disclosed herein creates static CSRs backed by byte arrays or Apache Arrow format that can be used by other graph libraries or many-core GPGPUs.

In various embodiments, a graph temporal store as disclosed herein enables efficient incremental graph computations, starting with its in-memory dynamic graph representation. Static CSR representations cannot handle dynamically changing LPGs since not all nodes have the same number of properties or property data types. In addition, while previous work shows that on-the-fly static CSR creation is feasible for analytical engines, the overhead for OLTP systems is significant, and especially so for large graphs, as it requires locking at node and relationship granularity. Therefore, in various embodiments, a system as disclosed herein uses an adjacency list-like design for dynamic representation.

Figure 9:
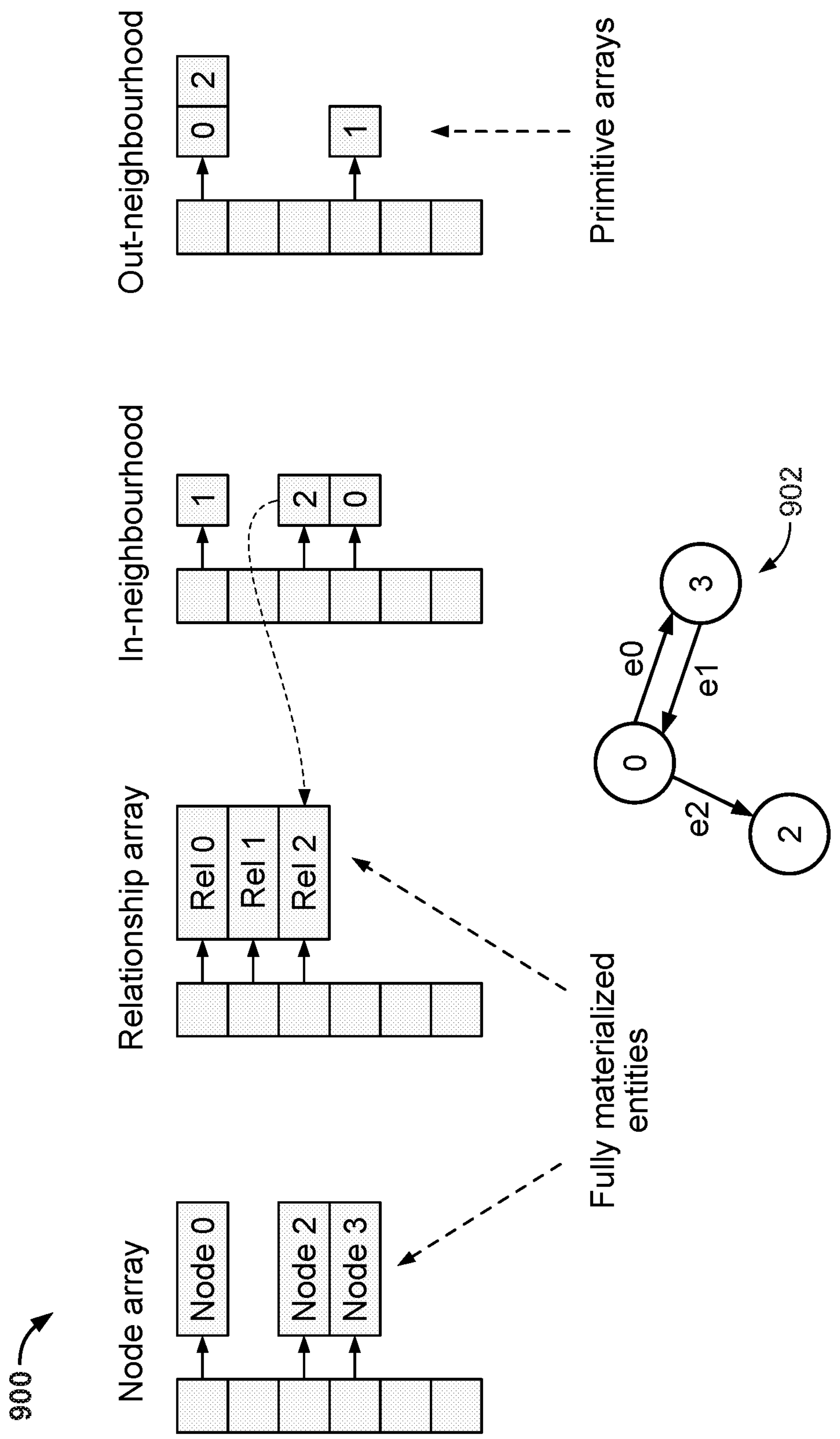
FIG. 9 illustrates an example of an in-memory graph representation that facilitates efficient incremental temporal graph algorithms in an embodiment of a temporal graph database system.

FIG. 9 illustrates an example of an in-memory graph representation that facilitates efficient incremental temporal graph algorithms in an embodiment of a temporal graph database system. In the example shown, the in-memory graph representation 900 for a graph 902 comprises four data structures: (i) a vector of materialized nodes (each containing all labels and properties); (ii) a vector of materialized relationships; (iii) a vector of the incoming relationship IDs for each node; and (iv) a vector of the outgoing relationship IDs for each node. In some embodiments, a system as disclosed herein is based on Sortledton graph data structure but can handle an arbitrary number of labels and properties using the materialized graph entities' vectors. The four vectors provide a compact memory representation with fast operations: O(1) time for entity insertion or update, and neighborhood access. Only node and relationship deletions can be more expensive depending on the updated neighborhood size, which can be amortized using gaps. For parallelization, no read-write locks are required, as updates are performed using key partitioning (e.g., by node ID) and reads always precede writes for analytics. In addition, the data structures are resized according to the maximum node ID seen from the updates during key partitioning without locking to avoid heavy performance penalties.

In various embodiments, to compact sparse graphs into a denser format, a system as disclosed herein uses a map to translate from a sparse domain of node IDs $[0,V_s)$, where only a subset of IDs refer to a valid node, to a dense domain $[0, V_d)$, where all IDs refer to valid nodes. This dense format enables efficient graph algorithms designed to store and retrieve data from vectors.

While the dynamic representation above is sufficient for LPG storage, to store temporal graphs, the following changes are performed, in various embodiments: (i) the node and relationship vectors store a list of entity versions instead of a single object; (ii) in- and out-neighborhood vectors store all neighborhood history for each entity. Every graph modification is modeled as a record append at the end of the respective adjacency lists. Thus, data is ordered by timestamp, allowing logarithmic-cost history access.

Incremental algorithms. Based on a graph representation such as describe above, in various embodiments, incremental algorithms are implemented as temporal procedures that materialize intermediate results and call the getDiff method between iterations. The system reuses the intermediate results to avoid redundant operations when analyzing consecutive snapshots. The intermediate and final results may be stored in GraphStore for efficient access by subsequent queries. Similar to the global queries, incremental algorithms require the step parameter to produce results for a batch and not every update.

In various embodiments, a system as disclosed herein supports three categories of incremental algorithms: (i) non-holistic aggregations, such as the average value of a node or relationship property; (ii) monotonic path-based algorithms like Breadth-First Search (BFS) or Single-Source Shortest Path (SSSP); and (iii) non-monotonic algorithms that can converge to correct results independently of node initialization such as PageRank or Graph Coloring. For aggregations, techniques from stream processing may be employed for efficient execution. Path-based and non-monotonic algorithms require more expensive dependency tracking, especially in the event of deletions. More specifically, for the monotonic path-based algorithms, the tag and reset technique are used, in various embodiments, where deleted nodes are tagged, and their value is reset before propagating the tags to the remaining graph. For the last category of graph algorithms, we use the optimizations introduced in Keval Vora, Rajiv Gupta, and Guoqing Xu. 2016. Synergistic analysis of evolving graphs. TACO (2016), in some embodiments, and propagate changes based on dependencies between iterations.

A temporal graph database system that formalizes time-evolving graphs based on the LPG model to enable (bi-) temporal analytics has been disclosed. In various embodiments, efficient graph temporal analytics are achieved irrespective of workload characteristics. A simple graph temporal API is provided to query the two dimensions of temporal graphs (time and graph size) and achieve efficient execution for both using a hybrid storage approach. Efficient graph data structures that enable fast incremental graph computations have been disclosed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A temporal graph database system, comprising:

communication interface configured to receive a call to a graph temporal application programming interface (API); and a processor coupled to the communication interface and configured to:

determine based at least in part on an API call received via the communication interface an estimated cardinality associated with the API call;

select, based at least in part on the estimated cardinality, a selected graph temporal store to be used to generate a response to the API call, wherein the selected graph temporal store is included in a plurality of graph temporal stores associated with a graph with which the API call is associated;

use the selected graph temporal store to generate a response to the API call; and provide the response via the communication interface;

wherein the plurality of graph temporal stores includes a snapshot-based graph temporal store comprising a plurality of snapshots of a graph, wherein each snapshot is associated with a corresponding timestamp and the snapshot-based graph temporal store is indexed by timestamp.

2. The system of claim 1, wherein the snapshot-based graph temporal store further includes a time-ordered log of updates between snapshots.

3. The system of claim 1, wherein the snapshot-based graph temporal store is selected based at least in part on a determination that the estimated cardinality is greater than a prescribed threshold.

4. The system of claim 3, wherein the prescribed threshold is associated with thirty percent of the graph.

5. The system of claim 1, wherein the plurality of graph temporal stores further includes an entity-based temporal graph store.

6. The system of claim 5, wherein the entity-based temporal graph store includes for each of a plurality of graph entities one or both of a start time when the entity was created or last modified and an end time when the entity was deleted.

7. The system of claim 5, wherein the entity-based temporal graph store is indexed by entity identifier (ID).

8. The system of claim 5, wherein the processor is configured to select and use the entity-based temporal graph store to respond to an API call comprising a point query.

9. The system of claim 5, wherein the processor is configured to select and use the entity-based temporal graph store to respond to an API call comprising a subgraph query associated with an entity and its n hop neighbors.

10. The system of claim 1, wherein the response includes graph and associated temporal information which are used to apply a temporal algorithm to the graph.

11. The system of claim 10, wherein the graph and associated temporal information included in the response are used to apply a temporal algorithm to the graph by performing incremental graph computations.

12. The system of claim 11, wherein the incremental graph computations are facilitated at least in part by a compute-efficient in-memory representation of the temporal graph data.

13. The system of claim 1, wherein the processor is further configured to receive a graph database transaction associated with the graph and update said plurality of graph temporal stores associated with the graph.

14. The system of claim 13, wherein the update includes adding a record to a time-ordered updates log.

15. The system of claim 13, wherein the update includes adding or updating a time associated with an entity with which the transaction is associated.

16. The system of claim 15, wherein the time comprises one or both of a system time and an application time.

17. A method, comprising:

receiving via a communication interface a call to a graph temporal application programming interface (API);

determining based at least in part on an API call an estimated cardinality associated with the API call;

selecting, based at least in part on the estimated cardinality, a selected graph temporal store to be used to generate a response to the API call, wherein the selected graph temporal store is included in a plurality of graph temporal stores associated with a graph with which the API call is associated;

using the selected graph temporal store to generate a response to the API call; and providing the response via the communication interface;

wherein the plurality of graph temporal stores includes a snapshot-based graph temporal store comprising a plurality of snapshots of a graph, wherein each snapshot is associated with a corresponding timestamp and the snapshot-based graph temporal store is indexed by timestamp.

18. A computer program product embodied in a non-transitory computer readable medium and comprising computer instructions for:

receiving via a communication interface a call to a graph temporal application programming interface (API);

determining based at least in part on an API call an estimated cardinality associated with the API call;

selecting, based at least in part on the estimated cardinality, a selected graph temporal store to be used to generate a response to the API call, wherein the selected graph temporal store is included in a plurality of graph temporal stores associated with a graph with which the API call is associated;

using the selected graph temporal store to generate a response to the API call; and providing the response via the communication interface;

wherein the plurality of graph temporal stores includes a snapshot-based graph temporal store comprising a plurality of snapshots of a graph, wherein each snapshot is associated with a corresponding timestamp and the snapshot-based graph temporal store is indexed by timestamp.

19. The method of claim 17, wherein the plurality of graph temporal stores further includes an entity-based temporal graph store.

20. The method of claim 19, wherein the entity-based temporal graph store is indexed by entity identifier (ID).

* * * * *